US011964639B2

(12) United States Patent
Nakagawa et al.

(10) Patent No.: US 11,964,639 B2
(45) Date of Patent: Apr. 23, 2024

(54) TRAVELING VEHICLE

(71) Applicant: KUBOTA CORPORATION, Osaka (JP)

(72) Inventors: Takateru Nakagawa, Sakai (JP); Akira Hiwatashi, Sakai (JP); Satoshi Oizumi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 765 days.

(21) Appl. No.: 17/261,989

(22) PCT Filed: Jun. 24, 2020

(86) PCT No.: PCT/JP2020/024697
§ 371 (c)(1),
(2) Date: Jan. 21, 2021

(87) PCT Pub. No.: WO2021/019968
PCT Pub. Date: Feb. 4, 2021

(65) Prior Publication Data
US 2021/0221347 A1 Jul. 22, 2021

(30) Foreign Application Priority Data
Aug. 1, 2019 (JP) ................................ 2019-142378

(51) Int. Cl.
B62D 49/06 (2006.01)
B60T 7/04 (2006.01)
(Continued)

(52) U.S. Cl.
CPC ................. B60T 11/04 (2013.01); B60T 7/04 (2013.01); F16D 23/12 (2013.01); F16D 65/28 (2013.01); B62D 49/06 (2013.01)

(58) Field of Classification Search
CPC ....... B62D 25/20; B62D 21/155; B62D 49/06
(Continued)

(56) References Cited

U.S. PATENT DOCUMENTS 7,520,364 B2 * 4/2009 Oka ........................ B62D 25/16
296/76
8,157,042 B2 * 4/2012 Fujiki .................. A01B 51/026
296/190.04
(Continued)

FOREIGN PATENT DOCUMENTS

JP 55-119228 U 8/1980
JP 63-130329 U 8/1988
(Continued)

OTHER PUBLICATIONS

Official Communication issued in International Patent Application No. PCT/JP2020/024697, dated Sep. 15, 2020.

Primary Examiner — Paul N Dickson
Assistant Examiner — Tiffany L Webb
(74) Attorney, Agent, or Firm — Keating & Bennett, LLP

(57) ABSTRACT

A traveling vehicle includes a mechanical brake link mechanism to transmit operation of a brake pedal to a brake device housed in a case and to control brakes of right and left rear wheels. The brake link mechanism includes a pair of brake rods extending in a front-back direction at sides of the case. A guard assembly includes a pair of guards extending in the front-back direction below the pair of brake rods. The pair of brake rods overlaps the pair of guards in a vertical direction. In a side view of the traveling vehicle, the pair of brake rods includes a higher portion positioned above a lower surface of the case to be distanced by a predetermined interval or more and positioned above the lower surface of the case, and a lower portion positioned below the higher
(Continued)

portion. The pair of guards overlaps at least all of the lower portions in the vertical direction.

20 Claims, 8 Drawing Sheets

(51) Int. Cl.
    *B60T 11/04*     (2006.01)
    *F16D 23/12*     (2006.01)
    *F16D 65/28*     (2006.01)

(58) Field of Classification Search
    USPC ..... 180/311, 325, 312; 280/781; 296/187.08
    See application file for complete search history.

(56) References Cited

U.S. PATENT DOCUMENTS

| | | |
|---|---|---|
| 2008/0061484 A1 | 3/2008 | Seino et al. |
| 2016/0208827 A1 | 7/2016 | Nishio |

FOREIGN PATENT DOCUMENTS

| | | |
|---|---|---|
| JP | 2006-016854 A | 1/2006 |
| JP | 2017-227249 A | 12/2017 |
| JP | 2018-167811 A | 11/2018 |
| WO | 2015/167023 A1 | 11/2015 |

\* cited by examiner

TRAVELING VEHICLE

BACKGROUND OF THE INVENTION

1. Field of the Invention

The present invention relates to a traveling vehicle.

2. Description of the Related Art

There has been widely known traveling vehicles including a mechanical brake link mechanism to transmit operation of a brake pedal to a brake device which is housed in a case and controls brakes of right and left rear wheels (for example, refer to Japanese Unexamined Patent Publication No. 2018-167811 A).

The mechanical brake link mechanism includes a pair of brake rods extending in the front-back direction at sides of the case. The brake of the rear wheel can be controlled by transmitting the operation of the brake pedal from the brake pedal disposed in the front of a driver to the brake device disposed in the rear of the driver through the brake rod.

SUMMARY OF THE INVENTION

In recent years, in foreign countries in particular, traveling vehicles are sometimes used for the efficient cultivation or reclamation of undeveloped lands (for example, forests, groves). When a traveling vehicle is used for cultivation, a brake rod of the vehicle is sometimes deformed. When the brake rod is deformed, the brake may not work even if the brake pedal is operated. Since the brake is vital for safety, it is required to reduce deformation of the brake rod.

In a typical approach, the periphery of the brake rod can be surrounded by a guard that does not expose the brake rod in order to reduce deformation of the brake rod. However, surrounding the periphery of the brake rod by a guard requires a design change of a tractor, and a material only for surrounding the brake rod, thereby possibly significantly increasing the cost of the traveling vehicle.

Thus, preferred embodiments of the present invention provide traveling vehicles each capable of reducing deformation of a brake rod while preventing a significant increase in cost.

A traveling vehicle according to an aspect of a preferred embodiment of the present invention includes a mechanical brake link mechanism to transmit operation of a brake pedal to a brake device which is housed in a case and controls brakes of right and left rear wheels. The brake link mechanism includes a pair of brake rods extending in a front-back direction at sides of the case. A guard assembly including a pair of guards extending in the front-back direction below the pair of brake rods is provided. The pair of brake rods overlaps the pair of guards in a vertical direction. In a side view of the traveling vehicle, the pair of brake rods includes a higher portion positioned above a lower surface of the case to be distanced by a predetermined interval or more and positioned above the lower surface of the case, and a lower portion positioned below the higher portion. The pair of guards overlaps at least all of the lower portions in the vertical direction.

A traveling vehicle according to an aspect of a preferred embodiment of the present invention includes a mechanical brake link mechanism to transmit operation of a brake pedal to a brake device which is housed in a case and controls brakes of right and left rear wheels. The brake link mechanism includes a pair of brake rods extending in a front-back direction at sides of the case. A guard assembly including a pair of guards extending in the front-back direction below the pair of brake rods is provided. The pair of brake rods overlaps the pair of guards in a vertical direction. The pair of guards includes a short guard and a long guard longer in the front-back direction than the short guard. The long guard overlaps all portions of one brake rod of the pair of brake rods in the vertical direction.

A traveling vehicle according to an aspect of a preferred embodiment of the present invention includes a mechanical brake link mechanism to transmit operation of a brake pedal to a brake device which is housed in a case and controls brakes of right and left rear wheels. The brake link mechanism includes a pair of brake rods extending in a front-back direction at sides of the case. A guard assembly including a pair of guards extending in the front-back direction below the pair of brake rods is provided. The pair of brake rods overlaps the pair of guards in a vertical direction. The traveling vehicle includes a mechanical PTO clutch link mechanism to transmit operation of a PTO clutch lever to a PTO clutch. The PTO clutch link mechanism includes a PTO clutch rod extending in the front-back direction at sides of the case. One of the pair of guards is positioned below the PTO clutch rod and overlaps the PTO clutch rod in the vertical direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
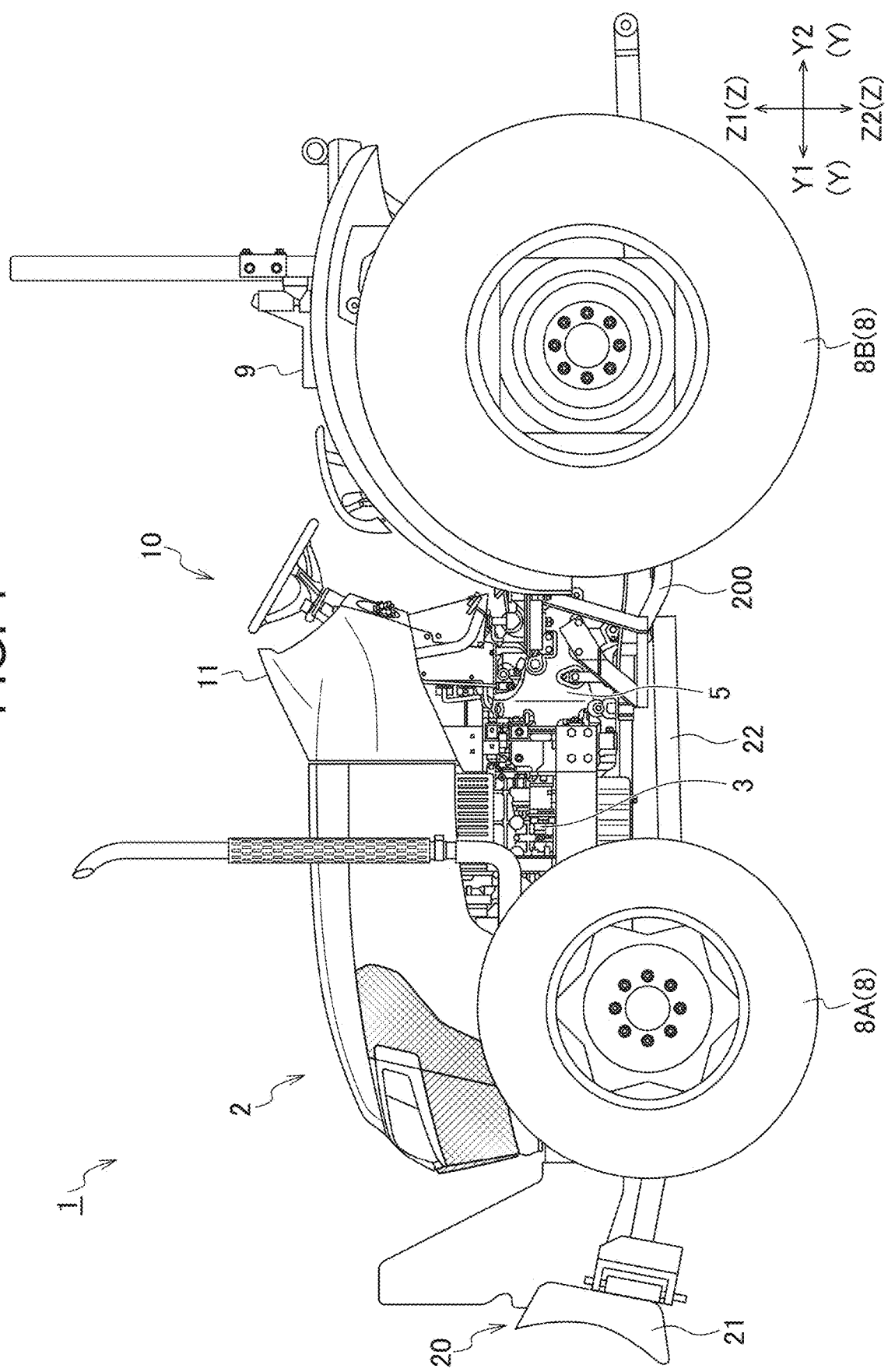
FIG. 1 is a side view of a traveling vehicle according to a preferred embodiment of the present invention.

A traveling vehicle according to an aspect of a preferred embodiment of the present invention includes a mechanical brake link mechanism to transmit operation of a brake pedal to a brake device which is housed in a case and to control brakes of right and left rear wheels, the brake link mechanism including a pair of brake rods extending in a front-back direction at sides of the case, and a guard assembly including a pair of guards extending in the front-back direction below the pair of brake rods, the pair of brake rods overlapping the pair of guards in a vertical direction. In a side view of the traveling vehicle, the pair of brake rods includes a higher portion positioned above a lower surface of the case to be distanced by a predetermined interval or more and positioned above the lower surface of the case, and a lower portion positioned below the higher portion. The pair of guards overlaps at least all of the lower portions in the vertical direction.

As a result of intensive examination, the inventors have discovered that a brake rod is pushed up from a tree root or stone when removing the tree root or stone buried in the soil by using the traveling vehicle, an obstacle such as a stump or stone exposed from the ground when traveling on an unpaved road hits the brake rod from below, and thus a strong upward thrust works on the brake rod, and the brake rod is deformed.

Since the pair of guards overlaps the pair of the brake rods in the vertical direction, the upward thrust the brake rod acts on the guard before acting on the brake rod, so that the thrust acting on the brake rod can be reduced. Thus, the deformation of the brake rod can be reduced. In addition, the guard assembly is not required to be disposed to the side and the higher portion of the brake rod, and thus the significant increase in cost can be reduced or prevented. In addition, the lower portion is closer to the lower surface of the case than the higher portion, and thus, for example, a stone is easily hit even when the stone hits on the lower surface of the case. Thus, the lower portion which is easily hit by, for example, a stone is protected by the guard, so that the deformation of the second brake rod by the upward thrust can be easily reduced.

According to an aspect of a preferred embodiment of the present invention, the pair of guards may include a short guard including a length shorter in the front-back direction than the length of one brake rod of the pair of brake rods and overlapping only a portion of the one brake rod in the vertical direction. A front edge of the short guard may be positioned rearward of a front edge of the one brake rod. The traveling vehicle may include an extension extending laterally from the case at a position anterior to the front edge of the short guard. The extension overlaps the one brake rod in the vertical direction below the one brake rod.

According to an aspect of a preferred embodiment of the present invention, the higher portion may be positioned above the extension.

According to an aspect of a preferred embodiment of the present invention, the pair of guards further may include a long guard longer in the front-back direction than the short guard. The guard assembly may include a plurality of supports fixed to the case. The plurality of supports may include a support to support the long guard and a support to support the short guard. The number of supports supporting the long guard may be larger than the number of supports supporting the short guard.

A traveling vehicle according to an aspect of a preferred embodiment of the present invention includes a mechanical brake link mechanism to transmit operation of a brake pedal to a brake device which is housed in a case and to control brakes of right and left rear wheels, the brake link mechanism including a pair of brake rods extending in a front-back direction at sides of the case, and a guard assembly including a pair of guards extending in the front-back direction below the pair of brake rods, the pair of brake rods overlapping the pair of guards in a vertical direction. The pair of guards includes a short guard and a long guard longer in the front-back direction than the short guard. The long guard overlaps all portions of one brake rod of the pair of brake rods in the vertical direction.

According to an aspect of a preferred embodiment of the present invention, the traveling vehicle may include a front working machine including a working unit to perform work and a mounting frame to mount the working unit on a vehicle body. A portion of the one brake rod may overlap the mounting frame in the vertical direction. The long guard may extend forward while curving upward from the lower side so as to be disposed between a portion of the one brake rod and the mounting frame.

According to an aspect of a preferred embodiment of the present invention, the guard assembly may include a plurality of supports fixed to the case. The plurality of supports may include a support to support the long guard and a support to support the short guard. The number of supports supporting the long guard may be larger than the number of supports supporting the short guard.

According to an aspect of a preferred embodiment of the present invention, each of the plurality of supports may be fastened to the case. The total number of fasteners of the supports supporting the long guard may be larger than the total number of fasteners of the supports supporting the short guard.

A traveling vehicle according to an aspect of a preferred embodiment of the present invention includes a mechanical brake link mechanism to transmit operation of a brake pedal to a brake device which is housed in a case and to control brakes of right and left rear wheels, the brake link mechanism including a pair of brake rods extending in a front-back direction at sides of the case, a guard assembly including a pair of guards extending in the front-back direction below the pair of brake rods, the pair of brake rods overlapping the pair of guards in a vertical direction, and a mechanical PTO clutch link mechanism to transmit operation of a PTO clutch lever to a PTO clutch, the PTO clutch link mechanism including a PTO clutch rod extending in the front-back direction at sides of the case. One of the pair of guard is positioned below the PTO clutch rod and overlaps the PTO clutch rod in the vertical direction.

Preferred embodiments of the present invention will be described in detail with reference to the accompanying drawings. In the following drawings, the same or similar reference numerals denote the same or similar portions. However, it should be noted that the drawings are schematic, and the proportions of each dimension are different from the actual figures. Therefore, specific dimensions should be determined in consideration of the following explanation. Further, the drawings may include portions including different dimensional relationships and ratios between the drawings. In the present specification and drawings, elements including substantially the same functions and structures are denoted by the same reference numerals, and redundant description thereof is omitted, and elements not directly related to preferred embodiments of the present invention are omitted from the drawings.

Figure 2:
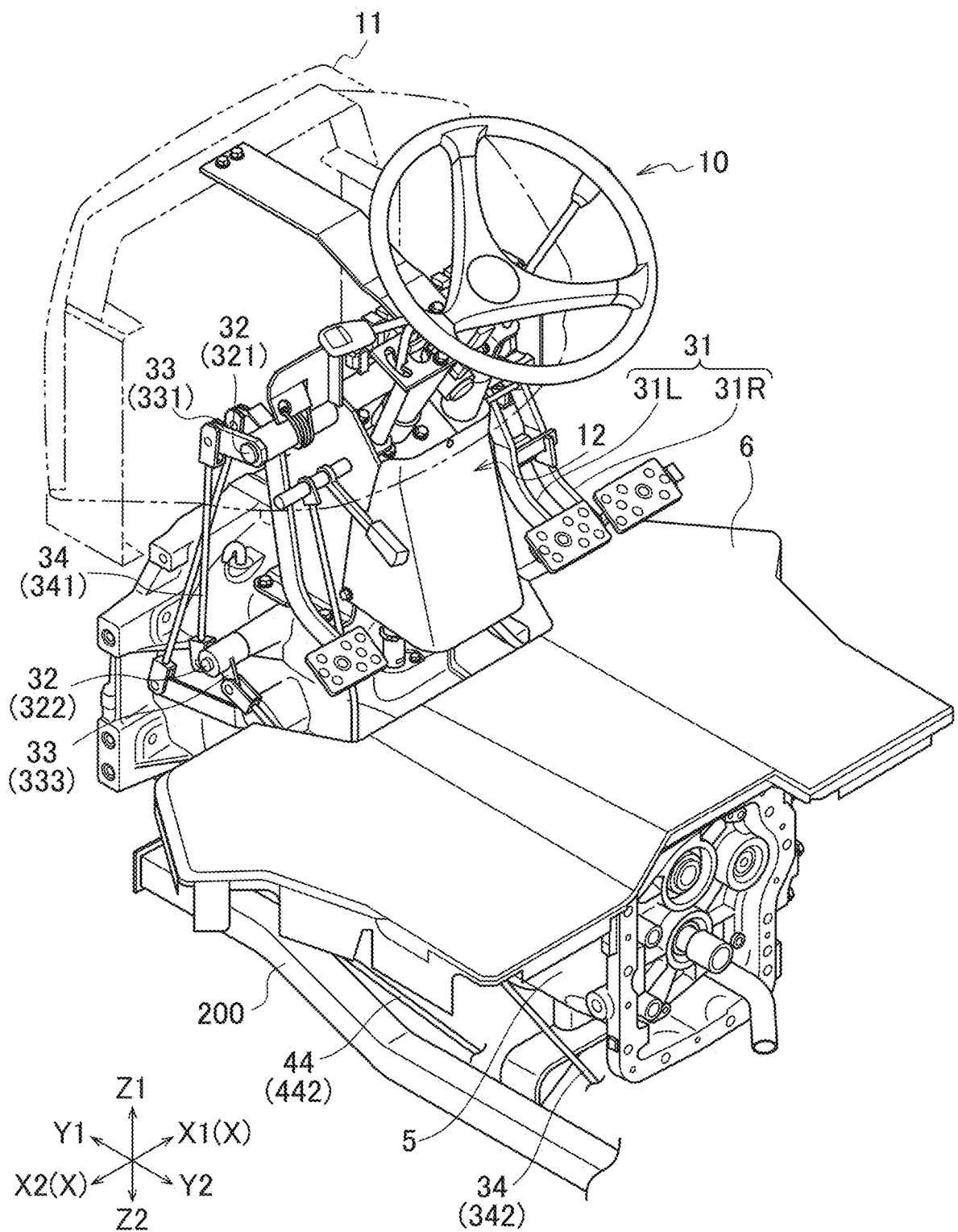
FIG. 2 is a perspective view of a steering device, as viewed from an upper left rear, of a traveling vehicle according to a preferred embodiment of the present invention.

The schematic configuration of a traveling vehicle 1 will be described with reference to FIGS. 1 and 2. FIG. 1 is a side view of the traveling vehicle according to a preferred embodiment of the present invention. FIG. 2 is a perspective view of a steering device according to the present preferred embodiment as viewed from the upper left rear. In this preferred embodiment, a tractor is exemplified as the traveling vehicle 1. An arrow X shown in the drawing indicates the width direction of the traveling vehicle 1, an arrow Y indicates the front-back direction of the traveling vehicle 1, and an arrow Z indicates the vertical direction of the traveling vehicle 1. An arrow X1 indicates the right direction of the traveling vehicle 1, and an arrow X2 indicates the left direction of the traveling vehicle 1. An arrow Y1 indicates a front direction (forward direction) of the traveling vehicle 1, and an arrow Y2 indicates a rear direction (backward direction) of the traveling vehicle 1. An arrow Z1 indicates an upward direction of the traveling vehicle 1, and an arrow Z2 indicates a downward direction of the traveling vehicle 1. The direction from the center to the right or left in the width direction X of the traveling vehicle 1 is referred to as the outward direction, and the direction from the right or left to the center in the width direction X of the traveling vehicle 1 is referred to as the inward direction. Thus, the center of the traveling vehicle 1 in the width direction X may be referred to as "inside of the vehicle", and the right and left sides of the center in the width direction X may be referred to as "outside of the vehicle".

As shown in FIGS. 1 and 2, the traveling vehicle 1 includes a vehicle body 2 capable of traveling. In this preferred embodiment, the vehicle body 2 includes an engine 3, a case 5, a case cover member 6, and a steering device 10. The engine 3 is a diesel engine. The engine 3 is positioned at the front of the traveling vehicle 1 and is covered with a bonnet. The engine 3 may be an electric motor or a hybrid type including a diesel engine and an electric motor.

The case 5 includes a flywheel housing, a clutch housing, and a transmission case. The flywheel housing is coupled to the rear of the engine 3 and houses the flywheel. The clutch housing is coupled to the rear of the flywheel housing and houses a clutch to intermittently transmit power of the engine 3 transmitted through the flywheel. The transmission case is coupled to the rear of the clutch housing.

The case 5 houses brake devices to control the brakes of the right and left rear wheels 8B, which will be described later. The case 5 also houses a PTO clutch. The case 5 houses devices such as a forward/reverse switching device to switch the forward/reverse movement of the traveling vehicle, and a transmission device to shift the power from the engine 3 and transmit it to the drive wheels. The case 5 is disposed below the steering device 10 in the vertical direction Z.

The case cover member 6 covers the upper portion of the case 5. A driver's foot is placed on the case cover member 6. The case cover member 6 is disposed on the front side of the driver's seat 9 in the front-back direction Y. The case cover member is disposed on the rear side of a steering base 12 in the front-back direction Y.

As shown in FIG. 1, the traveling vehicle 1 includes a traveling device 8 to support the vehicle body 2 so that the vehicle body can travel. The traveling device 8 is a wheel type traveling device including a plurality of front wheels 8A provided at the front of the vehicle body 2 and a plurality of rear wheels 8B provided at the rear of the vehicle body 2. The plurality of front wheels 8A include a left front wheel supported on the left side of a front axle case supported in the front of the engine 3 and a right front wheel supported on the right side of the front axle case. The plurality of rear wheels 8B includes a left rear wheel 8BL supported on the left side of the case 5 such as a transmission case and a right rear wheel 8BR supported on the right side of the case 5. The traveling device 8 may be a semi-crawler type traveling device (a traveling device including the front wheel 8A and a crawler type traveling mechanism adopted in place of the rear wheel 8B).

The front wheel 8A is a steering wheel steerable by movement of a cylinder rod of a steering cylinder disposed at the front of the front axle case. Steering the front wheels 8A can change the direction of the vehicle body 2 or steer the vehicle body. The steering cylinder is a hydraulic type. At least the rear wheel 8B of the front wheel 8A and the rear wheel 8B is a driving wheel, and power outputted from the transmission device is transmitted to the driving wheel. The driver's seat 9 on which a driver sits is mounted at the rear of the vehicle body 2. The steering device 10 partially covered with a steering cover 11 is provided in the front of the driver's seat 9.

The traveling vehicle 1 may be mountable with a front working machine 20 such as a front dozer. The front working machine 20 may be used for work for cultivation or reclamation. The front working machine 20 includes a working unit 21 to perform work and a mounting frame 22 to mount the working unit 21 on the vehicle body 2. The working unit 21 is mounted through the mounting frame 22 by mounting the mounting frame 22 on the vehicle body 2. The working unit 21 is positioned at the front of the vehicle body 2. The mounting frame 22 extends in the front-back direction Y below the vehicle body 2.

Figure 3:
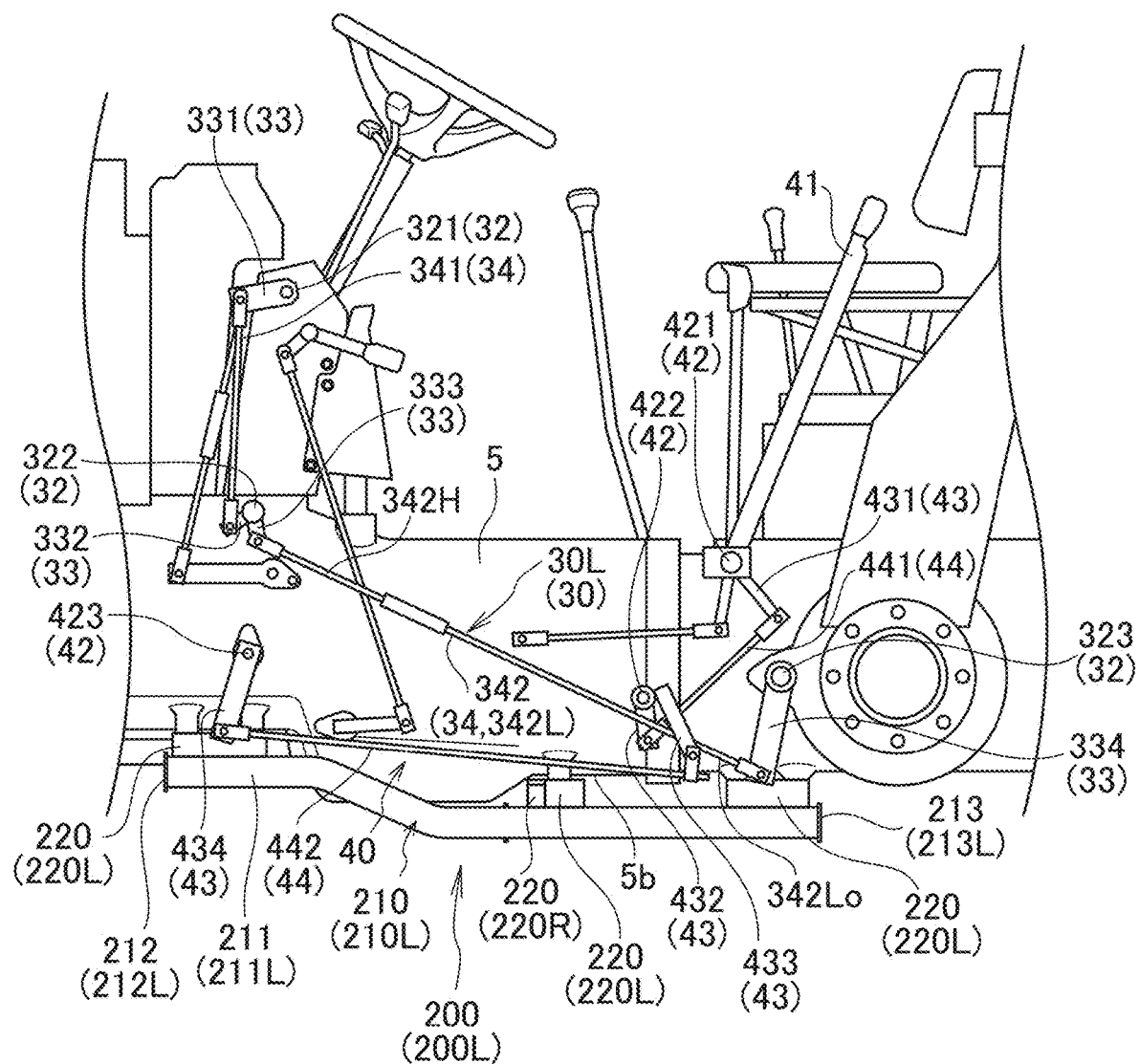
FIG. 3 is a left side view of a portion of a traveling vehicle according to a preferred embodiment of the present invention.
Figure 4:
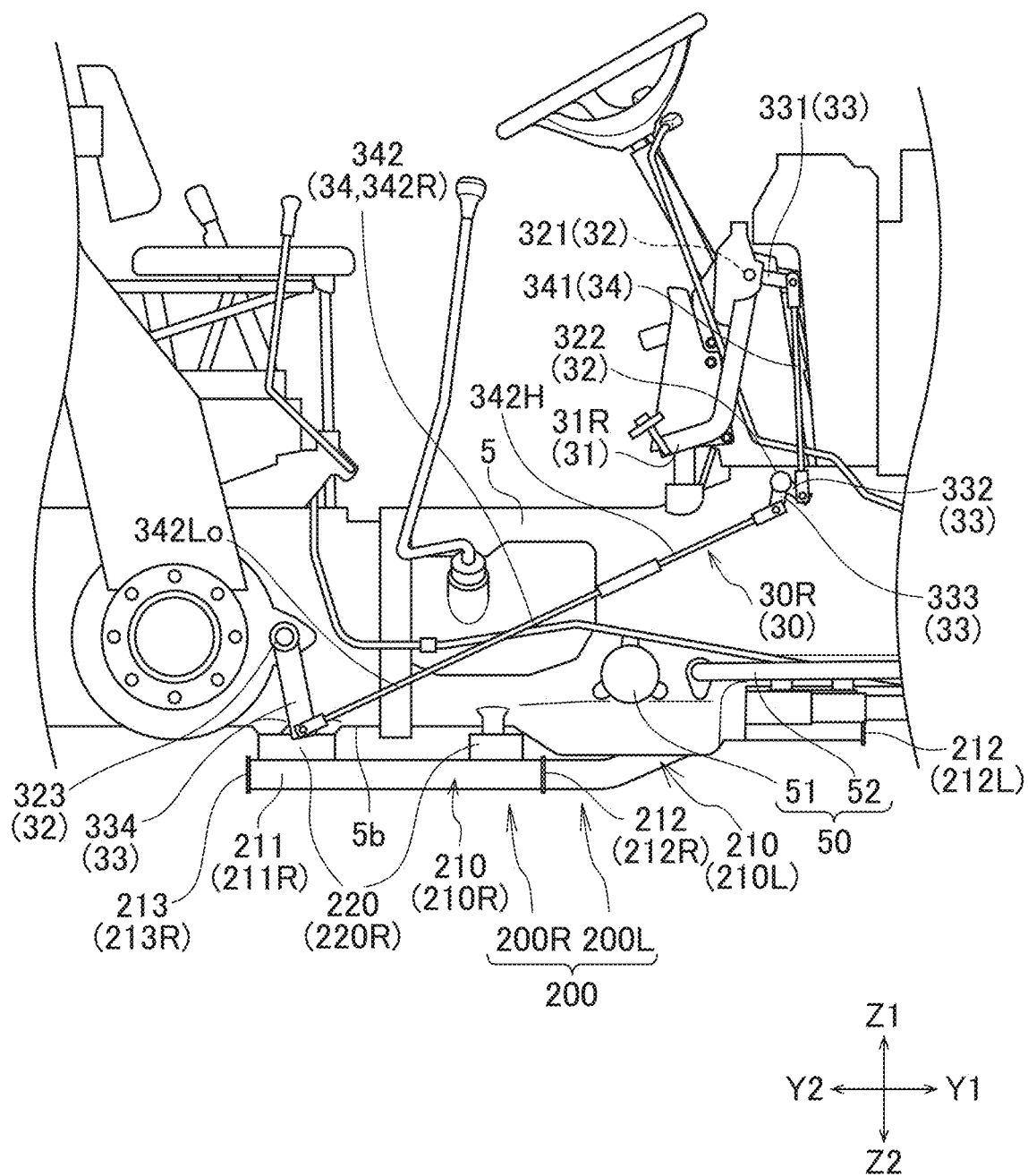
FIG. 4 is a right side view of a portion of a traveling vehicle according to a preferred embodiment of the present invention.

The detailed configuration of the traveling vehicle 1 will be then described with reference to FIGS. 1 to 4. FIG. 3 is a left side view of a portion of the traveling vehicle according to a preferred embodiment of the present invention. FIG. 4 is a right side view of a portion of the traveling vehicle according to the present preferred embodiment. The traveling vehicle 1 includes a mechanical brake link mechanism 30. The brake link mechanism 30 transmits the operation of the brake pedal 31 to a brake device housed in the case 5. The brake link mechanism 30 includes a pair of right and left brake link mechanisms. Specifically, the brake link mechanism 30 includes a right brake link mechanism 30R to transmit the operation of a right brake pedal 31R to the brake device, and a left brake link mechanism 30L to transmit the operation of a left brake pedal 31L to the brake device. A brake link mechanism 30 according to the present preferred embodiment includes a brake pedal 31, a spindle 32, an arm 33, and a brake rod 34. Each of the spindle 32, the arm 33, and the brake rod 34 may be a pair of right and left members disposed on the right and left sides of the traveling vehicle 1.

The brake pedal 31 includes the right brake pedal 31R and the left brake pedal 31L. The right brake pedal 31R is stepped on by a driver, and thus the right rear wheel 8BR is braked. The right brake pedal 31R is released from the stepped-on state, and thus the brake applied to the right rear wheel 8BR is released. Similarly, the left brake pedal 31L is stepped on by a driver, and thus the left rear wheel 8BL is braked. The left brake pedal 31L is released from the stepped-on state, and thus the brake applied to the left rear wheel 8BL is released.

The spindle 32 is rotatably fixed and is rotated by operation of the brake pedal 31. The spindle 32 may include a first spindle 321, a second spindle 322, and a third spindle 323. The arm 33 is fixed to the spindle 32, and thus the arm 33 rotates in cooperation with rotation of the spindle 32. The arm 33 may include a first arm 331 fixed to the first spindle 321, a second arm 332 fixed to the second spindle 322, a third arm 333 fixed to the second spindle 322, and a fourth arm 334 fixed to the third spindle 323.

A brake rod 34 is disposed between the arms 33 and is rotatably coupled to the arms 33. The brake rod 34 is a rod-shaped member. An end of the brake rod 34 is coupled to the arm 33. The brake rod 34 may include a first brake rod 341 extending in the vertical direction Z and a second brake rod 342 extending in the front-back direction Y at sides of the case 5. The upper end of the first brake rod 341 is coupled to the first arm 331, and the lower end of the first brake rod 341 is coupled to the second arm 332. The front end of the second brake rod 342 is coupled to the third arm 333, and the rear end of the second brake rod 342 is coupled to the fourth arm 334.

The second brake rod 342 may include a higher portion 342H and a lower portion 342Lo. The higher portion 342H is positioned above the lower surface 5b of the case 5 to be distanced by a predetermined interval or more in a side view of the traveling vehicle 1. When the second brake rod 342 is positioned at a lowermost level (low level), the higher portion 342H may be, for example, about 150 mm or more higher than the lower surface 5b of the case in a side view of the traveling vehicle 1. The higher portion 342H may be, for example, about 700 mm or more higher than the ground at the low level, or may be positioned above an extension member 50 described later. The lower portion 342Lo is positioned below the higher portion 342H. At the low level, the distance in the vertical direction Z between the lower portion 342Lo and the lower surface 5b of the case may be less than about 150 mm. The lower portion 342Lo may be about 700 mm or more higher than the ground at the low level, or may be positioned below the extension member 50 described later.

The second brake rod 342 includes a second right brake rod 342R disposed on the right side of the case 5 and a second left brake rod 342L disposed on the left side of the case 5. Thus, the second brake rod 342 includes a pair of right and left brake rods. The other members of the brake link mechanism 30 may also be a pair of right and left members.

The operation of the brake link mechanism 30 will be described using the right brake link mechanism 30R as an example. The right brake pedal 31R is stepped on by a driver, and thus the first spindle 321 is rotated and the first arm 331 is rotated upward around the first spindle 321. Thus, the first brake rod 341 coupled to the first arm 331 is pulled upward. The first brake rod 341 is pulled upward, and thus the second arm 332 is rotated around the second spindle 322 and the third arm 333 is also rotated around the second spindle 322. The third arm 333 is rotated, and thus the second brake rod 342 is pulled forward and the fourth arm 334 is rotated around the third spindle 323. Thus, the third spindle 323 fixed to the fourth arm 334 is rotated. The third spindle 323 is coupled to the brake device, and the brake device operates to brake the right rear wheel 8BR by rotation of the third spindle 323. The brake pedal 31 is released from the stepped-on state and thus reversely operates its components. The brake device operates to release the brake applied to the right rear wheel 8BR. The left brake link mechanism 30L has the same structure as the right brake link mechanism 30R, and thus redundant description is omitted.

The traveling vehicle 1 may include a mechanical PTO clutch link mechanism 40. The PTO clutch link mechanism 40 transmits the operation of a PTO clutch lever 41 to the PTO clutch. The PTO clutch link mechanism 40 according to the present preferred embodiment is disposed on the left side of the traveling vehicle 1. The PTO clutch link mechanism 40 according to the present preferred embodiment includes the PTO clutch lever 41, a spindle 42, an arm 43, and a PTO clutch rod 44.

The driver operates the PTO clutch lever 41 forward to engage the PTO clutch while operating the PTO clutch lever 41 backward to disengage the PTO clutch. The spindle 42 is rotatably fixed, and is rotated by operation of the PTO clutch lever 41. The spindle 42 may include a first spindle 421, a second spindle 422, and a third spindle 423.

The arm 43 is fixed to the spindle 42, and thus the arm 43 rotates in cooperation with rotation of the spindle 42. The arm 43 may include a first arm 431 fixed to the first spindle 421, a second arm 432 fixed to the second spindle 422, a third arm 433 fixed to the second spindle 422, and a fourth arm 434 fixed to the third spindle 423.

The PTO clutch rod 44 is disposed between the arms 43 and is rotatably coupled to the arms 43. The PTO clutch rod 44 is a rod-shaped member. An end of the PTO clutch rod 44 is coupled to the arm 43.

The PTO clutch rod 44 may include a first PTO clutch rod 441 extending in the vertical direction Z and a second PTO clutch rod 442 extending in the front-back direction Y at sides of the case 5. The upper end of the first PTO clutch rod 441 is coupled to the first arm 431, and the lower end of the first PTO clutch rod 441 is coupled to the second arm 432. The front end of the second PTO clutch rod 442 is coupled to the third arm 433, and the rear end of the second PTO clutch rod 442 is coupled to the fourth arm 434. The second PTO clutch rod 442 may be disposed below the second brake rod 342 (second left brake rod 342L).

In the PTO clutch link mechanism 40 according to the present preferred embodiment, the PTO clutch lever 41 is operated forward by a driver, and thus the first spindle 421 is rotated and the first arm 431 is rotated upward around the first spindle 421. Thus, the first PTO clutch rod 441 coupled to the first arm 431 is pulled upward. The first PTO clutch rod 441 is pulled upward, and thus the second arm 432 is rotated around the second spindle 422 and the third arm 433 is also rotated around the second spindle 422. The third arm 433 is rotated, and thus the second PTO clutch rod 442 is pulled backward and the fourth arm 434 is rotated around the third spindle 423. Thus, the third spindle 423 fixed to the fourth arm 434 is rotated. The third spindle 423 is coupled to the PTO clutch, and the PTO clutch is engaged by rotation of the third spindle 423. The PTO clutch lever 41 is operated backward and thus reversely operates its components to disengage the PTO clutch.

The traveling vehicle 1 may include the extension member 50. The extension member 50 extends laterally from the case 5 at a position anterior to the front edge of a right guard member 210R, which is a short guard member described later, and overlaps the second brake rod 342 in the vertical direction Z below the second brake rod 342. The extension member 50 may be, for example, at least one of an oil filter 51 to filter oil and an oil pipe 52 through which oil passes.

Figure 5:
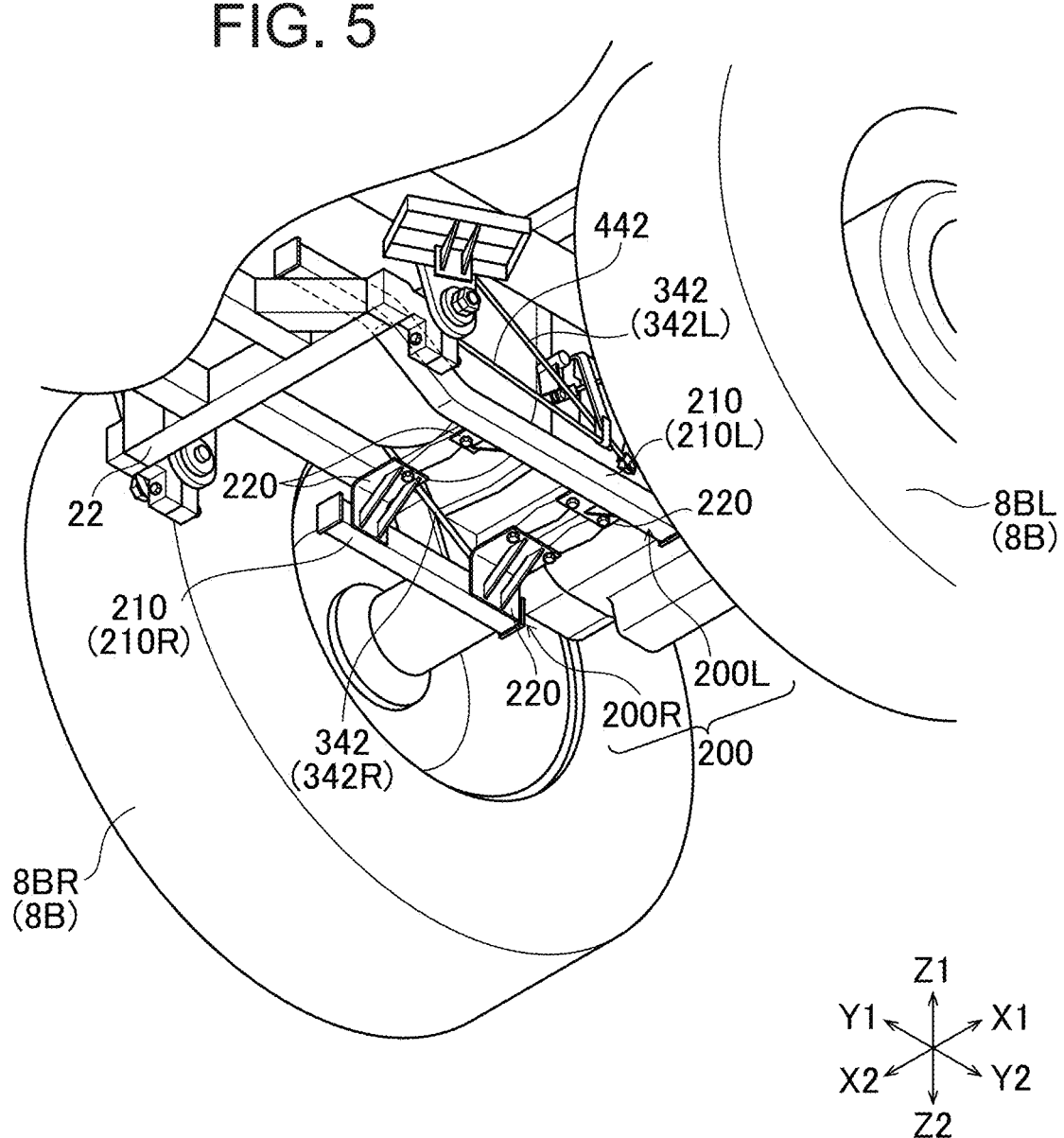
FIG. 5 is a perspective view of a portion of a traveling vehicle, as viewed from a lower left front, according to a preferred embodiment of the present invention.
Figure 6:
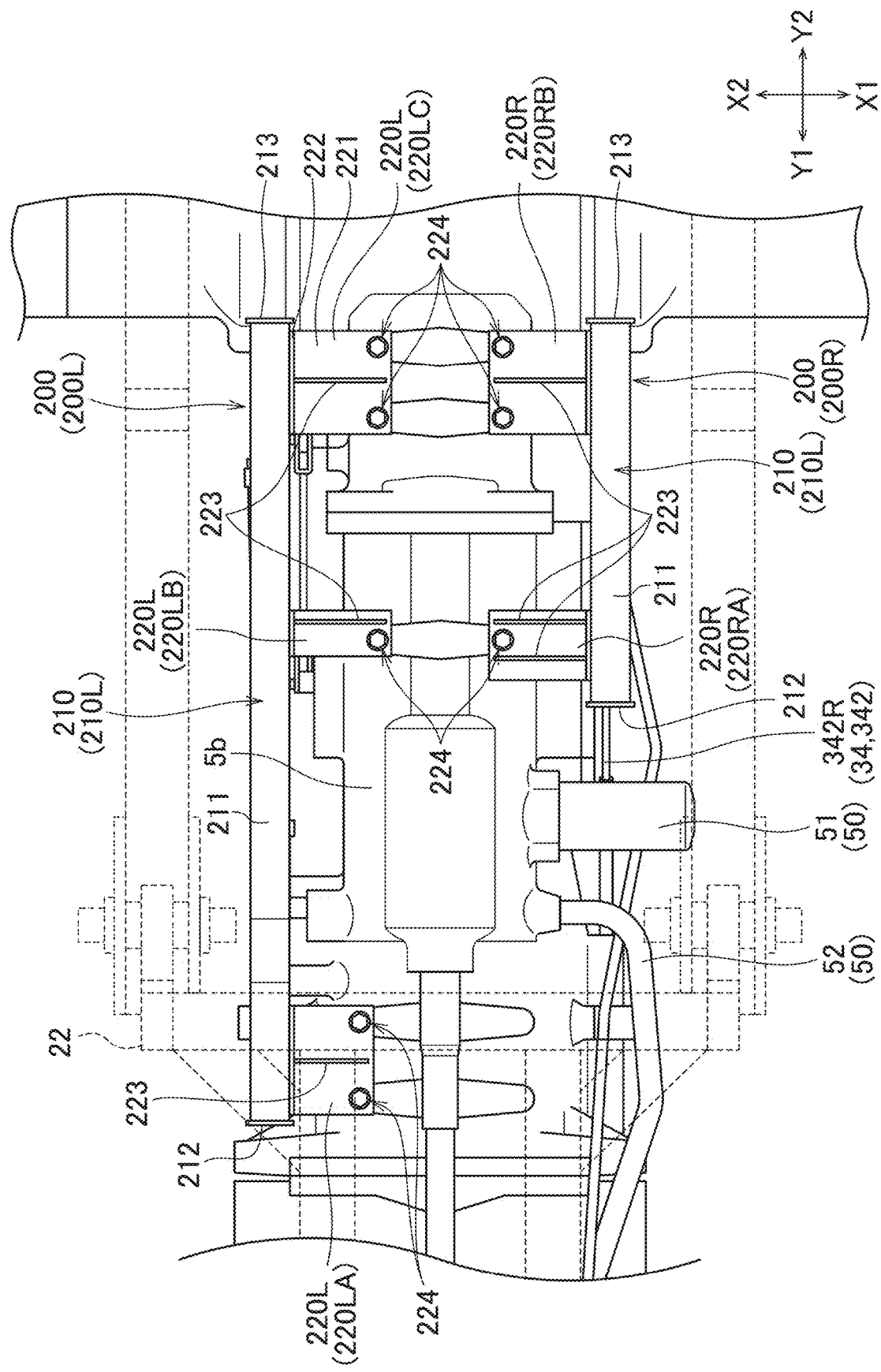
FIG. 6 is a bottom view of a portion of a traveling vehicle according to a preferred embodiment of the present invention.
Figure 7:
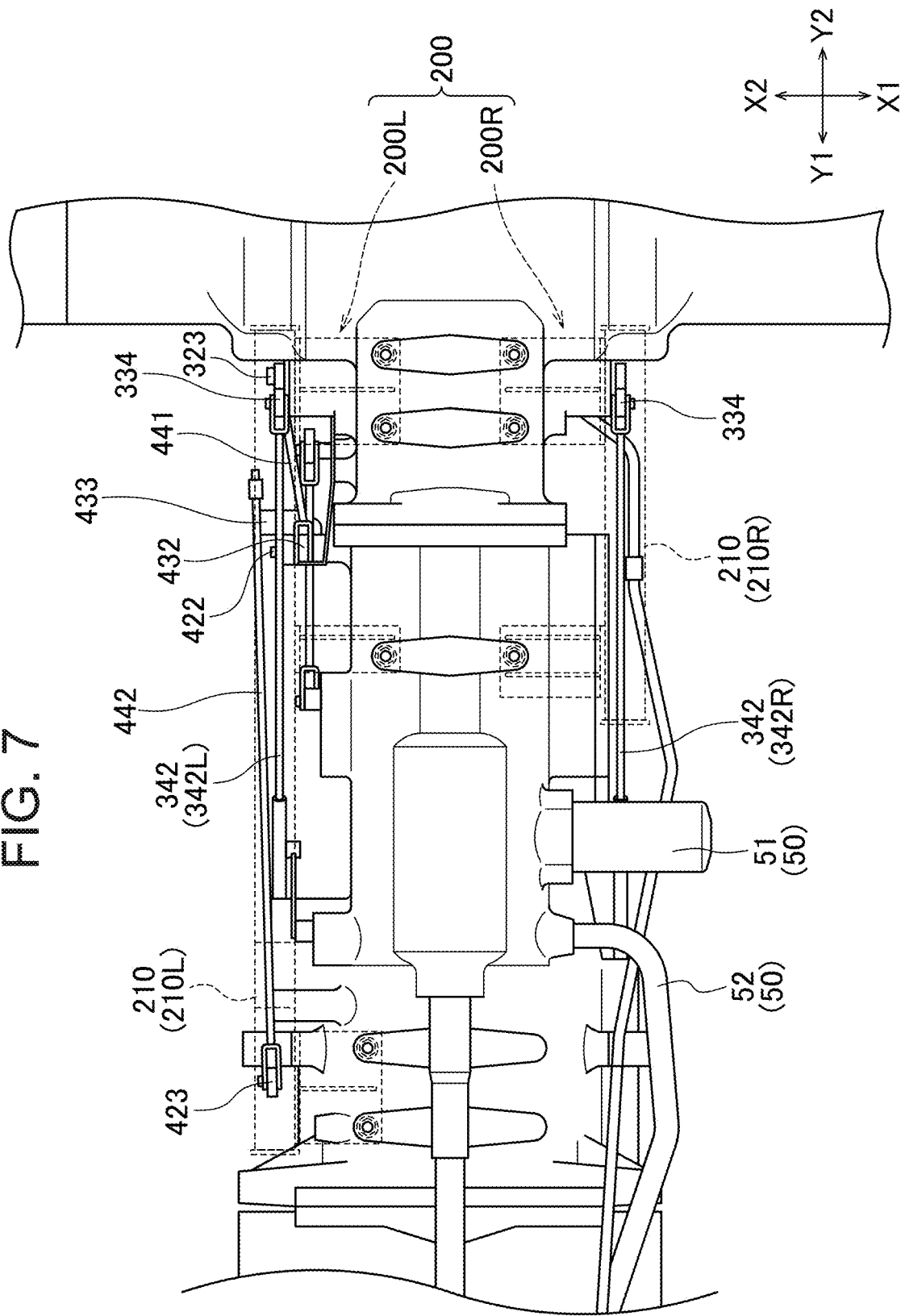
FIG. 7 is a bottom view of a portion of a traveling vehicle according to a preferred embodiment of the present invention.
Figure 8:
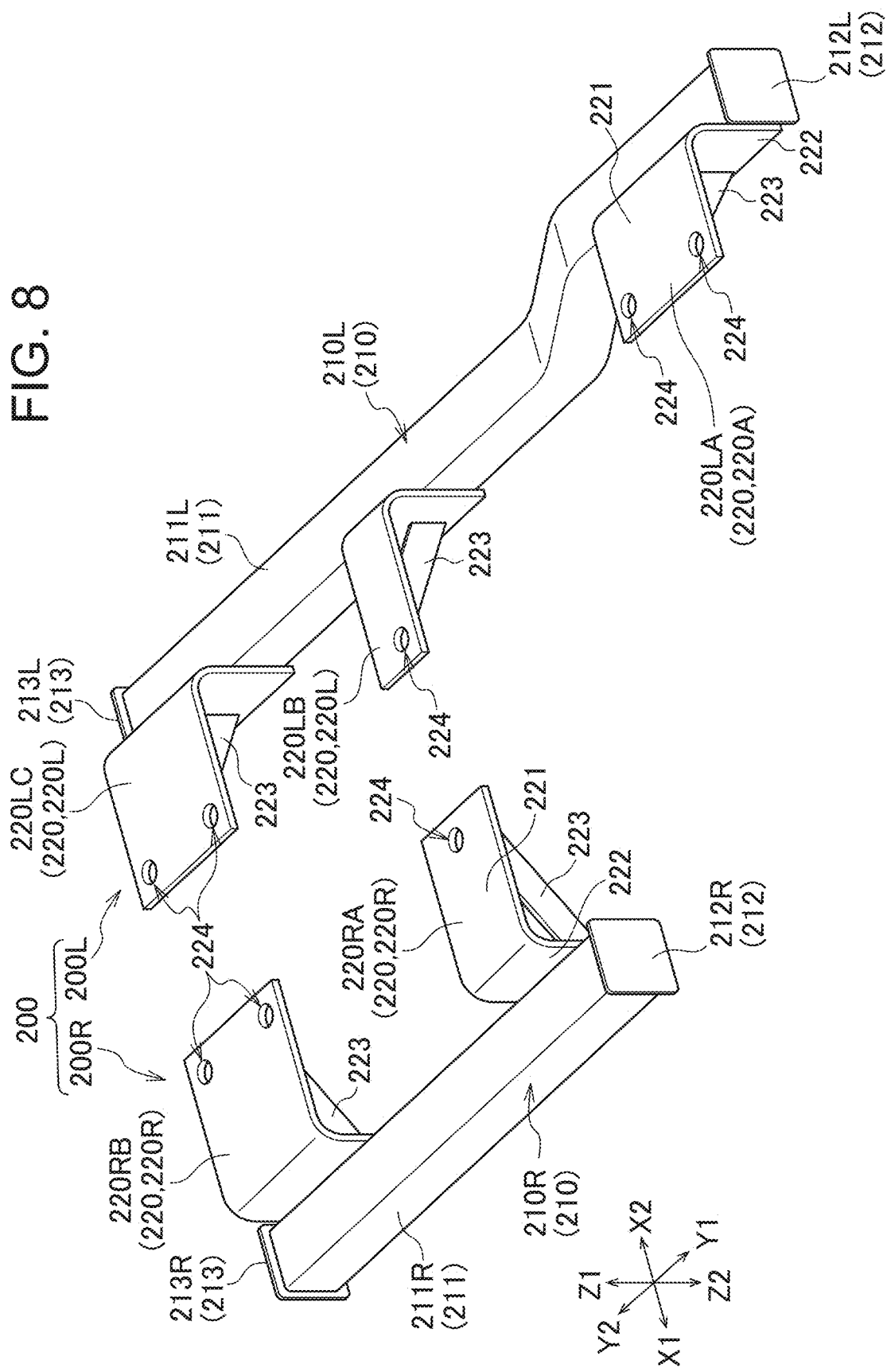
FIG. 8 is a perspective view of a guard according to a preferred embodiment of the present invention as viewed from an upper right front.

A guard 200 will be described with reference to FIGS. 1 to 8. FIG. 5 is a perspective view of a portion of the traveling vehicle, as viewed from the lower left front, according to the present preferred embodiment. FIGS. 6 and 7 are bottom views of a portion of the traveling vehicle according to the present preferred embodiment. FIG. 8 is a perspective view of the guard according to the present preferred embodiment as viewed from the upper right front.

As shown in FIGS. 3 to 8, the guard 200 is disposed below the pair of second brake rods 342. The guard 200 is not disposed on the side and above the pair of second brake rods 342. The guard 200 may include a pair of guard members 210 and a plurality of support members 220.

The guard member 210 is disposed below the second brake rod 342. The guard member 210 is disposed below the brake link mechanism 30 to be distanced from the mechanism. Thus, even if, for example, the second brake rod 342 moves, the second brake rod 342 does not come into contact with the guard member 210. Therefore, even if the guard member 210 is disposed below the second brake rod, the guard member does not obstruct the transmission of the operation of the brake pedal 31. The guard member 210 includes a main body 211 extending in the front-back direction L. The main body 211 may include a cylindrical (for example, a prismatic cylindrical shape) frame including openings at both ends in the front-back direction L. Thus, the weight of the guard member 210 can be reduced. The cylindrical frame of the main body 211 can reduce or prevent deformation of the main body by an upward thrust compared with the case where the main body is defined by a flat plate-shaped member.

As shown in FIG. 6, in bottom surface view of the traveling vehicle 1, the guard member 210 (main body 211) may be disposed inside the outermost surface of the case 5 in the width direction X, and may be disposed outside the innermost surface of the case 5 in the width direction W. Such a configuration enables the length of the guard member 210 in the width direction W to be not too long, and the cost required for the guard member 210 to be reduced. The guard member 210 may include a front lid portion 212 to close an opening on the front side of the main body 211 and a rear lid portion 213 to close an opening on the rear side of the main body 211. Such a configuration, for example, prevents muddy water from entering through the opening of the main body 211 extending in the front-back direction L, and prevents the main body 211 from being rusted.

The pair of guard members 210 may include a short guard member. The short guard member is shorter in the front-back direction L than one of the second brake rods 342, and overlaps only a portion of one of the second brake rods 342 in the vertical direction Z. The pair of guard members may also include a long guard member. The long guard member is longer in the front-back direction L than the short guard member. The pair of guard members 210 includes a right guard member 210R disposed on the right side of the vehicle body 2 and a left guard member 210L disposed on the left side of the vehicle body 2. In this preferred embodiment, the right guard member 210R is a short guard member, and the left guard member 210L is a long guard member. The main body 211L of the left guard member 210L is longer in the front-back direction L than the main body 211R of the right guard member 210R. The front edge of the right guard member 210R may be positioned rearward of the front edge of the second right brake rod 342R.

The plurality of support members 220 supports the guard member 210. The plurality of support members 220 is fixed to the case 5. The plurality of support members 220 may be fastened to the case 5 by fastening members such as bolts and nuts. The plurality of support members 220 may be fixed to the lower surface 5b of the case 5. The support member 220 extends from a portion fixed on the lower surface 5b of the case 5 toward the outside in the width direction X, and supports the guard member 210 at the outside in the width direction W of the support member 220. The guard member 210 and the support member 220 may be joined by welding, for example.

As shown in FIG. 8, the support member 220 may include a first plane portion 221 including a plane fixed in contact with the case 5, a second plane portion 222 coupled to the first plane portion 221 and including a plane fixed in contact with the guard member 210, and a rib portion 223 attached at a right angle to each of the first plane portion 221 and the second plane portion 222. The first plane portion 221 may include a fastening hole 224 into which the fastening member is inserted. The second plane portion 222 extends downward from the outer portion in the width direction W of the first plane portion 221.

In this preferred embodiment, the plurality of support members 220 includes a left support member 220L (220LA, 220LB, 220LC) to support a left guard member 210L as a long guard member, and a right support member 220R (220RA, 220RB) to support a right guard member 210R as a short guard member. The left support member 220L and the right support member 220R may be disposed apart from each other in the width direction W. Further, each left support member 220L may be disposed apart in the front-back direction L, and each right support member 220R may be disposed apart in the front-back direction L. Thus, the cost required for the support member 220 can be reduced because the support member 220 is not continuously disposed. In the present preferred embodiment, there are three left support members 220L and two right support members 220R, for example. The forwardmost left support member 220LA is fixed to a portion on the front side of a portion extending forward while curving upward from the lower side.

As shown in, for example, FIGS. 3 to 7, the pair of guard members 210 extends in the front-back direction Y below the pair of right and left brake rods (specifically, the pair of the second brake rods 342). The pair of second brake rods 342 overlaps the pair of guard members 210 in the vertical direction Z. As shown in FIG. 7, when the guard 200 is removed from the traveling vehicle 1, the second brake rod 342 faces the ground.

As a result of intensive examination, the inventors have discovered that the second brake rod 342 extending in the front-back direction L is pushed up from a tree root or stone when removing the tree root or stone buried in the soil by using the traveling vehicle, an obstacle such as a stump or stone exposed from the ground when traveling on an unpaved road hits the second brake rod 342 from below, and thus a strong upward thrust works on the second brake rod 342, and the second brake rod 342 is deformed. The inventors have discovered that the second brake rod 342 is easily deformed by an upward thrust, particularly because the second brake rod is a rod-shaped member extending in the front-back direction L.

As described above, since the pair of guard members 210 overlaps the pair of second brake rods 342 in the vertical direction Z, the upward thrust the second brake rod 342 acts on the guard member 210 before acting on the second brake rod 342, so that the thrust acting on the second brake rod 342 can be reduced. Thus, the deformation of the second brake rod 342 can be reduced. In addition, the guard 200 is not required to be disposed to the side and the higher portion of the second brake rod 342, and thus the significant increase in cost can be suppressed.

The pair of guard members 210 may overlap at least all of the lower portions 342Lo of the second brake rod 342 in the vertical direction Z. The lower portion 342Lo is closer to the lower surface 5b of the case 5 than the higher portion 342H, and thus, for example, a stone is easily hit even when the stone hits on the lower surface 5b of the case 5. Thus, the lower portion 342Lo which is easily hit by, for example, a stone is protected by the guard member 210, so that the deformation of the second brake rod 342 by the upward thrust can be easily reduced.

The extension member 50 may overlap the second right brake rod 342R in the vertical direction Z below the second right brake rod 342R. Making the right guard member 210R (short guard member) shorter than the second right brake rod 342R can protect the lower portion easily hit by, for example, a stone with the guard member 210 while reducing the cost required for the guard member 210. On the other hand, the front portion of the second right brake rod 342R, which is disposed forward of the front edge of the right guard member 210R, overlaps the extension member 50 in the vertical direction, and thus even if, for example, a stone is about to hit the front portion, the stone hits the extension member 50 before the stone hits the front portion, so that the thrust acting on the front portion can be reduced. Although there is a possibility that the extension member 50 is deformed by the extension member 50 being hit by, for example, a stone, the guard members can give a driver a sense of security by placing priority on reducing deformation of the brake rod 34 as a function vital for safety.

The distance in the front-back direction Y from the right guard member 210R (short guard member) to the extension member 50 may be about 150 mm or less. Thus, for example, a stone passes through between the right guard member 210R and the extension member 50 and hardly hits the second right brake rod 342R directly, and the deformation of the second right brake rod 342R can be reduced.

The higher portion 342H may be positioned above the extension member 50. The lower portion 342Lo positioned below the extension member 50 is protected by the guard member 210, so that the deformation of the second brake rod 342 by the upward thrust can be easily reduced. Since the higher portion 342H not protected by the guard member 210 is distanced from the lower surface 5b of the case 5, not only, for example, a stone hardly hits the higher portion, but also the stone hits the extension member 50 before the stone hits the higher portion, so that the thrust acting on the higher portion 342H can be reduced.

The left guard member 210L, which is a long guard member, may overlap all portions of the second left brake rod 342L in the vertical direction Z. Thus, all portions of the second left brake rod 342L can be protected by the left guard member 210L, so that the deformation of the second left brake rod 342L by the upward thrust can be reduced.

A portion of the second left brake rod 342L may overlap the mounting frame 22 in the vertical direction Z. The left guard member 210L may extend forward while curving upward from the lower side so as to be disposed between a portion of the second left brake rod 342L and the mounting frame 22. Thus, even if the front working machine 20 overlapping a portion of the second left brake rod 342L in the vertical direction Z is mounted on the traveling vehicle 1, the second left brake rod 342L does not come into contact with the mounting frame 22, so that both the front working machine 20 and the guard 200 can be mounted. Therefore, the deformation of the second left brake rod 342L can be reduced during work by the front working machine 20. The upward thrust acts on the mounting frame 22 before the upward thrust acts on the left guard member 210L. Thus, the upward thrust acting on the left guard member 210L can be reduced.

The number of left support members 220L supporting the left guard member 210L as the long guard member may be larger than the number of right support members 220R supporting the right guard member 210R as the short guard member. The left guard member 210L including a longer length in the front-back direction Y is more likely to receive the upward thrust than the right guard member 210R. By increasing the number of left support members 220L supporting the left guard member 210L, the thrust applied to the left guard member 210L is dispersed and released to the many left support members 220L, so that the breakage of the left guard member 210L can be easily reduced.

The total number of fasteners of the left support member 220L (specifically, the total number of fastening holes 224) may be larger than the total number of fasteners of the right support member 220R. Thus, when the upward thrust acts on the left guard member 210L, which is a long guard member susceptible to the upward thrust, it is possible to weaken the force applied to each fastening portion. The breakage of the fastening portion can be reduced. In the preferred embodiment, the total number of fasteners of the left support member 220L is five, and the total number of fasteners of the right support member 220R is three.

The number of rib portions 223 of the right support member 220R may be larger than the number of rib portions 223 of the left support member 220L. Thus, since the number of right support members 220R is smaller than the number of left support members 220L, the load on the right support members 220R per a member is larger than that on the left support member 220L, so that the right support member 220R is easily deformed. The deformation of the left support member 220L can be reduced by increasing the number of rib portions 223 of the right support member 220R.

The left support member 220LA disposed farthest forward and the left support member 220LC disposed farthest rearward of the plurality of left support members 220L may have a longer length in the front-back direction L than the remaining left support member 220LB. Further, the right support member 220RA disposed farthest forward of the plurality of right support members 220R may be longer in the front-back direction L than the remaining left support member 220LB. Thus, by firmly supporting the end of the guard member 210 in the front-back direction L, the guard member 210 can be made resistant to coming off even when receiving the upward thrust.

One of the pair of guard members 210 may be positioned below the second PTO clutch rod 442 extending in the front-back direction L and may overlap the second PTO clutch rod 442 in the vertical direction Z. The upward thrust to the second PTO clutch rod 442 acts on the guard member 210 before acting on the second PTO clutch rod 442, so that the thrust acting on the second PTO clutch rod 442 can be reduced. Thus, the deformation of the second PTO clutch rod 442 can be reduced.

Since the object to be most protected by the guard 200 is the second brake rod 342, the guard member 210 does not have to overlap a portion (for example, a portion less than about 5% of the second PTO clutch rod 442) of the second PTO clutch rod 442 in the vertical direction Z in bottom surface view of the traveling vehicle 1 (see FIGS. 6 and 7). Thus, the second brake rod 342 can be protected without enlarging the guard member 210, so that design change of a tractor and a significant increase in cost for the guard 200 can be suppressed.

In the present preferred embodiment, the lower end of the fourth arm 334 is positioned closest to the ground among its components of the brake link mechanism 30, so that the guard member 210 may overlap the fourth arm 334 in the vertical direction Z. Thus, the fourth arm 334, which is less likely to deform than the second brake rod 342 but is more susceptible to the thrust by, for example, a stone, can be protected.

In the present preferred embodiment, the left guard member 210L overlaps its components coupled to from the first arm 331 to the fourth arm 334 in the vertical direction Z. Thus, not only the second left brake rod 342L but also the other members of the left brake link mechanism 30L can be protected. The left guard member 210L may also overlap members (in particular, the rod member) of the other link mechanisms other than the PTO clutch link mechanism 40 in the vertical direction Z. Thus, members of the other link mechanisms can also be protected.

In the present preferred embodiment, the guard 200 is fixed to the lower surface 5*b* of the case 5 by fastening members such as bolts and nuts. Therefore, the guard 200 can also be provided in the existing traveling vehicle 1. The brake rod can be protected without changing the design of a tractor.

Although the present invention has been described in detail with reference to the preferred embodiments described above, it will be apparent to those skilled in the art that the present invention is not limited to the preferred embodiments described herein. The present invention may be practiced as modifications and variations without departing from the spirit and scope of the present invention as defined by the claims. Accordingly, the description herein is intended to be illustrative and has no restrictive meaning with respect to the present invention.

In an above-described preferred embodiment, the right guard member 210R is a short guard member and the left guard member 210L is a long guard member, but the present invention is not limited thereto. The right guard member 210R may be a long guard member, and the left guard member 210L may be a short guard member. The length of the right guard member 210R and the left guard member 210L in the front-back direction L may be the same. Both the right guard member 210R and the left guard member 210L may overlap all of the second brake rods 342 in the vertical direction Z.

In an above-described preferred embodiment, the guard member 210 may include a cylindrical frame, but the present invention is not limited thereto. The guard member 210 may be a flat plate-shaped member.

In the traveling vehicle 1 provided with the guard 200, the distance between the lowermost end of the second brake rod 342 and the ground may be less than about 1 meter at the low level. Thus, the guard 200 can be provided when the second brake rod 342 is close to the ground and the second brake rod 342 is likely to receive an upward thrust.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A traveling vehicle comprising:
   a mechanical brake link mechanism to transmit operation of a brake pedal to a brake device which is housed in a case and controls brakes of right and left rear wheels; wherein
   the brake link mechanism includes a pair of brake rods extending in a front-back direction at sides of the case;
   a guard assembly including a pair of guards extending in the front-back direction below the pair of brake rods is provided;
   the pair of brake rods overlaps the pair of guards in a vertical direction;
   in a side view of the traveling vehicle, the pair of brake rods includes:
     a higher portion positioned above a lower surface of the case to be distanced by a predetermined interval or more and positioned above the lower surface of the case; and
     a lower portion positioned below the higher portion; and
   the pair of guards overlaps at least all of the lower portions in the vertical direction.

2. The traveling vehicle according to claim 1, wherein
   the pair of guards includes a short guard including a length shorter in the front-back direction than a length of one brake rod of the pair of brake rods and overlapping only a portion of the one brake rod in the vertical direction;
   a front edge of the short guard is positioned rearward of a front edge of the one brake rod;
   the traveling vehicle includes an extension extending laterally from the case at a position anterior to the front edge of the short guard; and
   the extension overlaps the one brake rod in the vertical direction below the one brake rod.

3. The traveling vehicle according to claim 2, wherein the higher portion is positioned above the extension.

4. The traveling vehicle according to claim 3, wherein
   the pair of guards includes a long guard longer in the front-back direction than the short guard;
   the guard assembly includes a plurality of supports fixed to the case;
   the plurality of supports includes a support to support the long guard and a support to support the short guard; and
   a number of the supports supporting the long guard is larger than a number of the supports supporting the short guard.

5. The traveling vehicle according to claim 4, wherein
   each of the plurality of supports is fastened to the case; and
   a total number of fasteners of the supports supporting the long guard is larger than a total number of fasteners of the supports supporting the short guard.

6. The traveling vehicle according to claim 5, wherein
   the support includes a first plane portion including a plane fixed in contact with the case, a second plane portion coupled to the first plane portion and including a plane fixed in contact with the guard, and a rib portion attached at a right angle to each of the first plane portion and the second plane portion; and
   a number of rib portions of the support supporting the short guard is larger than a number of rib portions of the support supporting the long guard.

7. The traveling vehicle according to claim 4, wherein
   the support includes a first plane portion including a plane fixed in contact with the case, a second plane portion coupled to the first plane portion and including a plane fixed in contact with the guard, and a rib portion attached at a right angle to each of the first plane portion and the second plane portion; and
   a number of rib portions of the support supporting the short guard is larger than a number of rib portions of the support supporting the long guard.

8. The traveling vehicle according to claim 2, wherein
   the pair of guards includes a long guard longer in the front-back direction than the short guard;
   the guard assembly includes a plurality of supports fixed to the case;
   the plurality of supports includes a support to support the long guard and a support to support the short guard; and
   a number of the supports supporting the long guard is larger than a number of the supports supporting the short guard.

9. The traveling vehicle according to claim 8, wherein
each of the plurality of supports is fastened to the case; and
a total number of fasteners of the supports supporting the long guard is larger than a total number of fasteners of the supports supporting the short guard.

10. The traveling vehicle according to claim 9, wherein
the support includes a first plane portion including a plane fixed in contact with the case, a second plane portion coupled to the first plane portion and including a plane fixed in contact with the guard, and a rib portion attached at a right angle to each of the first plane portion and the second plane portion; and
a number of rib portions of the support supporting the short guard is larger than a number of rib portions of the support supporting the long guard.

11. The traveling vehicle according to claim 8, wherein
the support includes a first plane portion including a plane fixed in contact with the case, a second plane portion coupled to the first plane portion and including a plane fixed in contact with the guard, and a rib portion attached at a right angle to each of the first plane portion and the second plane portion; and
a number of rib portions of the support supporting the short guard is larger than a number of rib portions of the support supporting the long guard.

12. A traveling vehicle comprising:
a mechanical brake link mechanism to transmit operation of a brake pedal to a brake device which is housed in a case and controls brakes of right and left rear wheels; wherein
the brake link mechanism includes a pair of brake rods extending in a front-back direction at sides of the case;
a guard assembly including a pair of guards extending in the front-back direction below the pair of brake rods is provided;
the pair of brake rods overlaps the pair of guards in a vertical direction;
the pair of guards includes a short guard and a long guard longer in the front-back direction than the short guard; and
the long guard overlaps all portions of one brake rod of the pair of brake rods in the vertical direction.

13. The traveling vehicle according to claim 12, further comprising:
a front working machine including a working unit to perform work and a mounting frame to mount the working unit on a vehicle body; wherein
a portion of the one brake rod overlaps the mounting frame in the vertical direction; and
the long guard extends forward while curving upward from the lower side so as to be disposed between a portion of the one brake rod and the mounting frame.

14. The traveling vehicle according to claim 13, wherein
the guard includes a plurality of supports fixed to the case;
the plurality of supports includes a support to support the long guard and a support to support the short guard; and
a number of supports supporting the long guard is larger than a number of supports supporting the short guard.

15. The traveling vehicle according to claim 14, wherein
each of the plurality of supports is fastened to the case; and
a total number of fasteners of the supports supporting the long guard is larger than a total number of fasteners of the supports supporting the short guard.

16. The traveling vehicle according to claim 14, wherein
the support includes a first plane portion including a plane fixed in contact with the case, a second plane portion coupled to the first plane portion and including a plane fixed in contact with the guard, and a rib portion attached at a right angle to each of the first plane portion and the second plane portion; and
a number of rib portions of the support supporting the short guard is larger than a number of rib portions of the support supporting the long guard.

17. The traveling vehicle according to claim 12, wherein
the guard includes a plurality of supports fixed to the case;
the plurality of supports includes a support to support the long guard and a support to support the short guard; and
a number of supports supporting the long guard is larger than a number of supports supporting the short guard.

18. The traveling vehicle according to claim 17, wherein
each of the plurality of supports is fastened to the case; and
a total number of fasteners of the supports supporting the long guard is larger than a total number of fasteners of the supports supporting the short guard.

19. The traveling vehicle according to claim 17, wherein
the support includes a first plane portion including a plane fixed in contact with the case, a second plane portion coupled to the first plane portion and including a plane fixed in contact with the guard, and a rib portion attached at a right angle to each of the first plane portion and the second plane portion; and
number of rib portions of the support supporting the short guard is larger than a number of rib portions of the support supporting the long guard.

20. A traveling vehicle comprising:
a mechanical brake link mechanism to transmit operation of a brake pedal to a brake device which is housed in a case and controls brakes of right and left rear wheels; wherein
the brake link mechanism includes a pair of brake rods extending in a front-back direction at sides of the case;
a guard assembly including a pair of guards extending in the front-back direction below the pair of brake rods is provided;
the pair of brake rods overlaps the pair of guards in a vertical direction;
the traveling vehicle further comprises a mechanical PTO clutch link mechanism to transmit operation of a PTO clutch lever to a PTO clutch;
the PTO clutch link mechanism includes a PTO clutch rod extending in the front-back direction at sides of the case; and
one of the pair of guards being positioned below the PTO clutch rod and overlapping the PTO clutch rod in the vertical direction.

* * * * *